United States Patent [19]

Avramidis et al.

[11] 3,981,205

[45] Sept. 21, 1976

[54] DUAL RANGE INFINITELY VARIABLE SPEED DRIVE

[75] Inventors: Stellios A. Avramidis, Greenfield; William T. Partridge, Indianapolis, both of Ind.

[73] Assignee: FMC Corporation, San Jose, Calif.

[22] Filed: July 5, 1974

[21] Appl. No.: 486,261

[52] U.S. Cl. ............ 74/230.17 A; 74/230.17 E; 74/221; 74/722; 74/231 R; 74/234
[51] Int. Cl.² ............ F16H 55/56; F16H 9/00; F16H 9/16
[58] Field of Search ........... 74/230.17 A, 230.17 E, 74/230.17 F, 217 R, 217 CV, 221, 722, 665 A, 665 GE, 231 R, 234, 230.17 B, 230.17 C; 123/195 A

[56] References Cited
UNITED STATES PATENTS

| | | | |
|---|---|---|---|
| 1,921,749 | 8/1933 | Haug | 74/221 |
| 1,955,813 | 4/1934 | Klappnecker | 74/221 |
| 3,863,513 | 2/1974 | Schnettler | 74/221 |
| 3,869,932 | 3/1975 | Fletcher | 74/230.17 C |

*Primary Examiner*—Samuel Scott
*Assistant Examiner*—A. Russell Burke
*Attorney, Agent, or Firm*—J. F. Verhoeven; C. E. Tripp

[57] ABSTRACT

A self-centering variable diameter drive pulley, driven from an engine, receives a first drive belt which is also received on a self-centering variable diameter driven pulley. One or more engine accessories are driven through the variable diameter driven pulley at a relatively constant speed through a wide range of engine speeds by virtue of the variable diameter pulleys, one of which changes diameter in accordance with the speed at which it rotates. Another accessory, or accessories, are driven by pulleys which receive a second drive belt. The second drive belt is received over the first drive belt at the variable diameter drive pulley to transmit power from the drive pulley to said other accessories.

8 Claims, 8 Drawing Figures

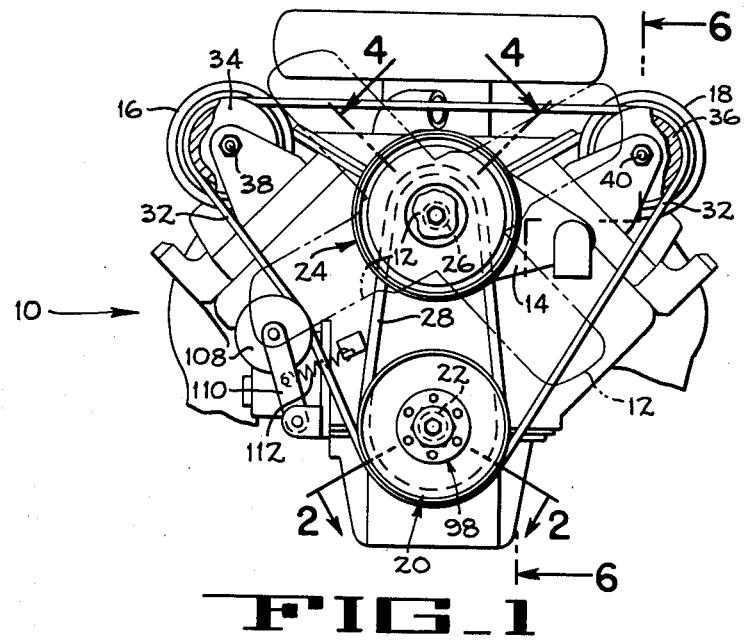
FIG_1
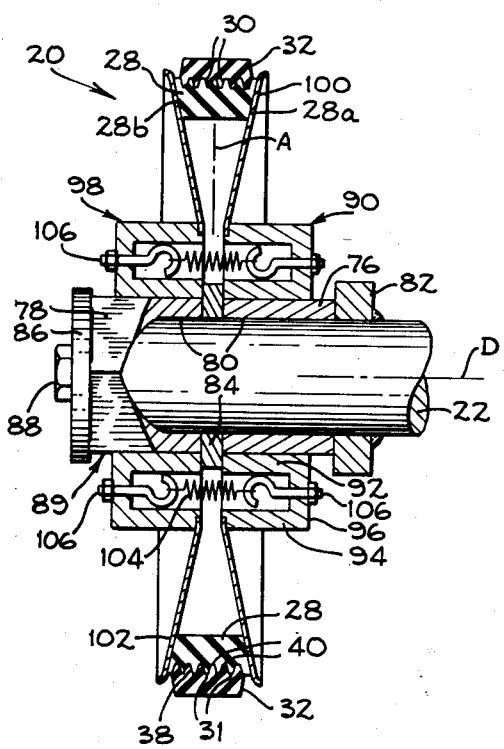
FIG_2    FIG_3

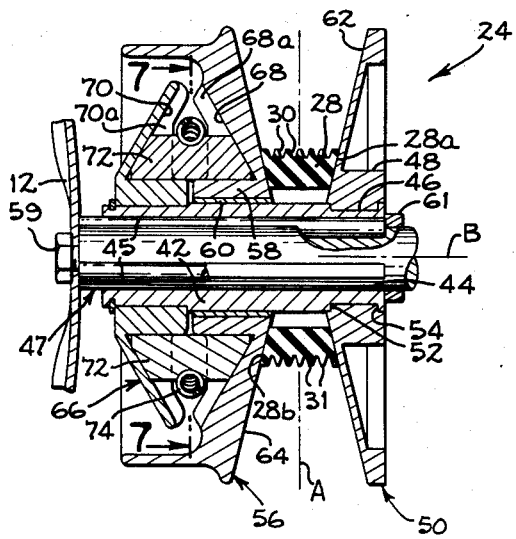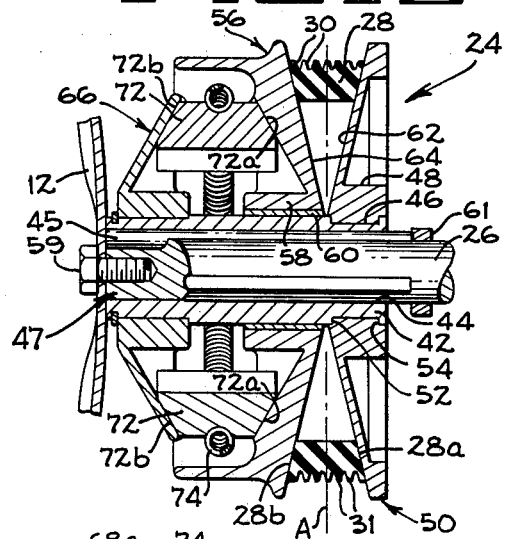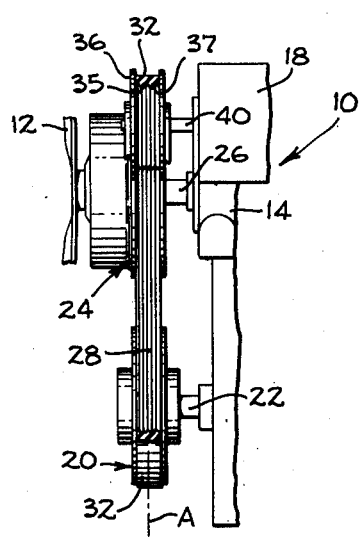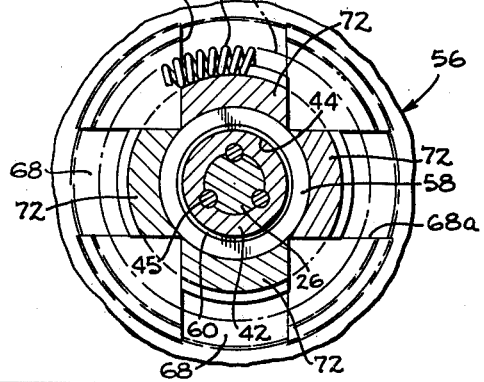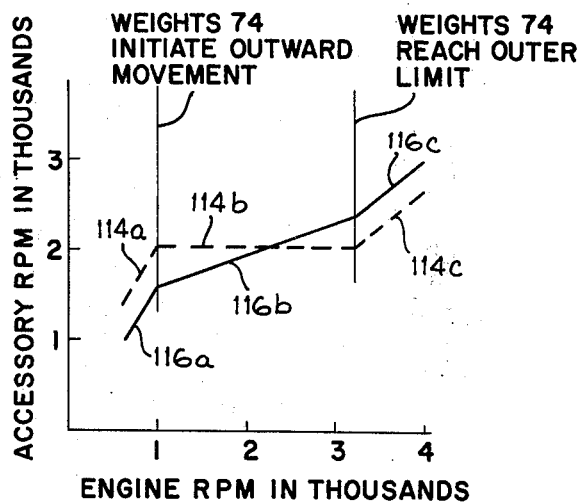

DUAL RANGE INFINITELY VARIABLE SPEED DRIVE

BACKGROUND OF THE INVENTION

In a conventional system for driving engine accessories from an engine, the accessories are driven through driven pulleys by a drive belt which is received on a drive pulley connected to the engine. Thus the speed ratio between the engine (or the drive pulley driven therefrom) and any particular accessory has been constant.

It has been recognized for some time that it is not desirable to drive an accessory at a constant ratio to the speed of the engine. Such a practice results generally in too low a speed for the accessory at low engine speeds and too high a speed for the accessory at high engine speeds. In other words, it has heretofore been realized that a variable speed ratio between the engine and the accessories to maintain the accessory speed more nearly constant over the range of the engine speed would be desirable.

Many different constructions have been proposed to achieve this goal. One proposed solution, disclosed in the copending United States patent application of L. J. Stephanoff, Ser. No. 422,250, filed Dec. 6, 1973, now abandoned, and assigned to the same assignee as the present invention, utilizes a centrifugally operated variable diameter pulley which is driven by the engine. A first belt, trained around the drive pulley and an idler pulley, is provided solely to make good driving contact with the drive pulley. A second belt is trained over the first belt at the drive pulley, in good driving engagement with the first belt, and is received on pulleys of the accessories to be driven.

SUMMARY OF THE INVENTION

In the present invention, as in the Stephanoff invention, two belts are trained, one over the other, on the drive pulley, which is a variable diameter pulley. Unlike the Stephanoff invention, however, one of the belts of the present invention, as, for example, the lower belt, is trained over another variable diameter pulley which is connected to one or more accessories. The other belt is trained over pulleys connected to another group of accessories.

Thus, in the present invention, both belts are driven by a variable diameter pulley, as in the Stephanoff invention, but in the present invention, unlike the Stephanoff invention, one belt drives a first group of one or more accessories through another variable diameter pulley at an almost constant speed, while the other belt drives a second group of one or more accessories through a pulley or pulleys (which need not be variable diameter pulleys) at a different, less nearly constant, speed range.

The variable diameter pulleys of the present invention have flanges, both of which are shiftable parallel to the axis of rotation of the pulleys so that the pulleys will be self-centering to maintain both belts in the common plane of the pulleys which are connected to the accessories.

It is therefore one object of the present invention to drive two different accessories through two different speed ranges from the same drive pulley.

It is another object of the present invention to drive two groups of accessories through two belts from the same variable diameter drive pulley.

BRIEF DESCRIPTION OF THE DRAWINGS

FIG. 1 is a front view of an automobile engine having accessories driven by a drive system constructed in accordance with the present invention.

FIG. 2 is a view taken on the line 2—2 of FIG. 1, showing the drive pulley in the closed, or maximum diameter, condition.

FIG. 3 is a view taken as the view of FIG. 2, showing the pulley of FIG. 2 in the open, or minimum diameter, condition.

FIG. 4 is a view taken on the line 4—4 of FIG. 1, showing the driven pulley in the open, or minimum diameter, condition.

FIG. 5 is a view taken as the view of FIG. 4, showing the pulley of FIG. 4 in a closed, or maximum diameter, condition.

FIG. 6 is a view taken on the line 6—6 of FIG. 1.

FIG. 7 is a view taken on the line 7—7 of FIG. 4.

FIG. 8 is a graph plotting speeds of the first and second groups of accessories against engine speed.

DESCRIPTION OF THE PREFERRED EMBODIMENT

There is shown in FIG. 1 an automobile engine 10 on which are mounted a plurality of engine accessories including a first group of accessories comprising a fan 12, and a water pump 14, and including a second group of accessories comprising, for example, an alternator 16 and an air conditioning compressor 18. While it would be most desirable to drive all of these accessories at a constant speed, regardless of the speed of the engine, it is desirable, if all cannot be driven at a constant speed, to drive the first group of accessories at a more nearly constant speed than the second group of accessories. The fan, in order to be adequate for air-conditioned cars, has to move a large volume of air at idle speed. Because of this, however, the fan demands too much horsepower at high engine speeds if driven at a constant speed ratio. One previously used method of avoiding this condition is by use of a slip clutch which disconnects the fan at high engine speeds. In addition, conventional accessory drives operate the water pump well above its optimum range for good idle performance.

In order to achieve an almost constant speed for the first group of accessories, a self-centering variable diameter pulley 20 is mounted on a shaft 22 which may, for example, be an extension of the engine crankshaft. A second self-centering variable diameter pulley 24 is mounted on a shaft 26 which, in the illustrative embodiment disclosed, is the main shaft of the water pump 14. The pump 14 is inboard (that is, on the engine side) of the pulley 24, and the fan 12 is mounted on shaft 26 outboard of the pulley.

A first endless drive belt 28 is trained over pulleys 20, 24 to transmit power from the engine crankshaft 22 to the fan 12 and the water pump 14. The belt has a plurality of alternate, longitudinal, V-shaped grooves 30 and longitudinal ridges 31 in its outer surface, as shown best in FIG. 2. A second drive belt 32 is trained over the first drive belt at pulley 20, and is also trained over pulleys 34 and 36. The second drive belt 32 has a plurality of alternate, longitudinal, V-shaped grooves 38 and longitudinal ridges 40 on its inner surface so that the grooves and ridges of the first drive belt 28 mesh with the ridges and grooves of the second drive belt 32. The pulleys 34 and 36 also have alternate circumferential grooves 35 and ridges 37 (see FIG. 6) to mate with the grooves and ridges on the inner surface of belt 32.

It will be noted that the second drive belt 32 is coupled to the first drive belt 28 at the variable diameter drive pulley 20. It will be apparent, however, that the belts could as well be coupled at a variable diameter driven pulley if the driver pulley were located in a suitable position (as in the position of pulley 20) to receive both belts.

The pulleys 34 and 36 are mounted, respectively, on shafts 38 and 40 which constitute the main shafts of the second group of accessories 16 and 18, respectively. The pulleys 20, 24, 34 and 36 all lie in a common plane A (see FIG. 6) as do the drive belts 28 and 32. The mating drive belts 28 and 32 form the subject of a copending patent application of Stellios A. Avramidis, Ser. No. 486,262, filed July 5, 1974 and assigned to the same assignee as the present invention. Alternatively, the mating belts 28, 32 may, instead of the longitudinal grooves, have teeth on the outer and inner surfaces, respectively, as shown in the previously mentioned copending application of L. J. Stephanoff.

The driven pulley 24, which is shown in more detail in FIGS. 4 and 5, is centrifugally actuated to vary the diameter of the pulley in accordance with the speed of the pulley. At the same time, the pulley is self-centering so that the belt 28 received thereon remains in the same plane A regardless of the effective diameter of the pulley.

The pulley is mounted on an adapter 42 which has a central bore 44 into which shaft 26 is received. The adapter is slidable longitudinally (that is, parallel to central axis B of shaft 26) on shaft 26, but is prevented from rotation relative to shaft 26 by the rods 45 which are received in aligned longitudinal grooves in the adapter and shaft. The shaft 26 defines an axle 47 to support the pulley 24. The outer surface of the adapter has flats 46 on which the hub 48 of one flange 50 of pulley 24 is received in non-rotatable relation to adapter 42. It will be noted that hub 48 is positioned between shoulders 52 and 54 on adapter 42 to prevent longitudinal shifting of flange 50 relative to the adapter 42. The adapter, however, can slide longitudinally on shaft 26 between the fan 12, which is secured to shaft 26 by bolt 59, and a collar 61 which is secured to shaft 26. The other flange 56 of pulley 24 has a hub 58 with a bushing 60 which is slidable longitudinally on adapter 42.

The flanges 50 and 56 have mutually facing canted flange surfaces 62 and 64 between which the belt 28 is received. The belt 28 has side surfaces 28a, 28b canted in complementary relation to the surfaces 62, 64.

The adapter 42 has mounted thereon a flange 66 at the end of the adapter opposite the end on which the flange 50 is mounted. The flange 56 has a canted surface 68 which faces the inner canted surface 70 of flange 66. The canted surfaces 68 and 70 have inwardly extending flanges 68a and 70a which define four radial ways to receive the weights 72. The weights have canted side surfaces 72a, 72b complementary to canted surfaces 68, 70. The weights 72 are normally urged inwardly (toward shaft 26) by means of a circular spring 74 which encircles the weights. Thus, the belt 28 will normally spread the flanges 50 and 56 apart, decreasing the diameter of the pulley, since the flange 56 can move away from flange 50 when the weights are in their inner position. However, when the shaft 26 exceeds a predetermined speed, the weights will move radially outwardly by virtue of centrifugal force and force the flanges 50 and 56 together, thereby forcing belt 28 radially outwardly and increasing the diameter of the pulley.

It will be noted that flange 50 of pulley 24 can slide freely (with adapter 42 to which it is secured) with respect to shaft 26 and that flange 56 of pulley 24 can slide freely on adapter 42. Therefore, the pulley 24 will remain centered with respect to plane A by virtue of the position of belt 28 which is held in plane A by pulley 20.

The pulley 20 is shown in more detail in FIGS. 2 and 3. A pair of adapters 76, 78 each has a central bore 80 in which the shaft 22 is received. Although the inner surfaces of the adapters are circular in cross-section, the outer surfaces are hexagonal. The first adapter 76 is tightly wedged between a collar 82, tightly secured to shaft 22, and a floating collar 84. The second adapter 78 is tightly wedged between the floating collar 84 and a collar, or washer, 86 which tightly holds the adapters and floating collar assembly against fixed collar 82 by means of a bolt 88. The shaft 22 and adapters 76, 78 define an axle 89 to receive pulley 20.

The pulley 20 has a first hub 90, mounted on adapter 76, comprising two bands 92, 94. The bands (when viewed along central axis D of shaft 22) both have circular outer surfaces and band 94 has a circular inner surface. Band 92 has a hexagonal shaped inner surface, to conform to the outer surfaces of adapters 76. The bands 92, 94 are joined by a vertical plate portion 96 to define a hub of reversed C-shaped configuration (when viewed transverse to axis D). The pulley 20 has a second hub 98, similar to hub 90 but reversed as shown in FIGS. 2 and 3. The hubs 90 and 98 have outwardly extending pulley flanges 100, 102, respectively, which are canted away from the central plane A (passing centrally between the flanges perpendicular to axis D) as the flanges extend outwardly from axis D. Tension springs 104 are arrayed between the hubs and connected thereto by hooks 106, to urge the pulley flanges together, thereby tending to center the flanges with respect to collar 84 which is substantially centered on axis A, when the belt 28 is in the position of FIG. 2. When the belt is in the position of FIG. 3, the pulley will be centered by engagement of hubs 90, 98 with collars 82, 86 respectively. Between these two extreme positions, the pulley is centered by the belt 32 which is maintained in plane A by pulleys 34, 36.

The operation of the mechanism of the present invention will be best understood by reference to FIG. 1. At low engine speed, the weights 72 of the centrifugally actuated pulley 24 are held in their radially inner position by spring 74, permitting the flange members 50 and 56 to separate. Flange surface 68 is thereby moved toward flange surface 70, as shown in FIG. 4. It will be noted that at any given radial position of the weights 72, the entire pulley assembly (including hubs 48, 58, flanges 50, 56, 66, weights 72 and spring 74) floats as a unit on axle 47 (between the limits defined by collar 61 and fan 12) so that the entire unit tends to remain in the position on the axle where belt 28 (which is held in axis A by pulley 20) remains in axis A. It will be noted from FIG. 4 that at low engine speed, the pulley flanges 56 and 62 are spread apart, and the belt 28 rides on pulley 24 in its radially innermost position.

The endless belt 28 is of fixed length so when the flanges of pulley 24 are spread apart, the flanges 100, 102 of pulley 20 are pulled together, by springs 104, as shown in FIG. 2, to force the belt to an outer position on pulley 20. It will be noted that the adapters 76 and 78 act as spacers and hold the floating collar 84 in a stationary centered position on axis A. Although each hub 90, 98 can move between collars, the springs 104 tend to move he hubs toward the centered collar 84.

At low engine speed, with the pulley 20 having a large effective diameter (as defined by the position the belt assumes thereon) and the pulley 24 having a small effective diameter, a high speed ratio is produced by the drive train defined by pulley 20 (which is driven through the crankshaft by engine 10), belt 28, and pulley 24. In the graph of FIG. 8, where engine speed is the abscissa and accessory speed is the ordinate, the curves 114a, 114b and 114c represent, at various engine speeds, the speed of the water pump and fan. The curves 116a, 116b and 116c represent, at various engine speeds, one of the accessories 16 or 18. The slope of the curve 114a, which is determined by the speed ratio between the drive and driven pulleys before the weights initiate outward movement, is constant until the speed of the engine is great enough to initiate outward movement of the weights. Similarly, the slope of curve 116a is constant under the same conditions, since the speed ratio between drive pulley 20 and driven pulleys 34 and 36 is also constant. Since the effective diameter of pulley 20 changes after the speed of the engine reaches a certain value, and the diameters of pulleys 34, 36 remain constant, a pulley 108, mounted on arm 110, is biased against belt 32 by spring 112, to take up the slack in belt 32.

As the engine speed increases, the weights 72 in pulley 24 begin to move outwardly, causing the flange 56 to move toward flange 50. As the pulley flanges 50 and 56 are forced together, the effective diameter of the pulley 24 increases and the belt 28 thereon is moved radially outwardly. This outward movement of the belt on pulley 24 forces the flanges of pulley 20 apart, against the bias of springs 104, to decrease the effective diameter of pulley 20. When the effective diameter of pulley 24 increases, and the effective diameter of pulley 20 decreases, the ratio of the drive train consisting of pulley 20, belt 28, and pulley 24 decreases. Since the engine speed has increased, however, the speed of accessories 12 and 14 tend to remain the same, as indicated by curve 114b. On the other hand, the speed of accessories 16 and 18 at this time (represented by curve 116b) tend to increase with the increased engine speed, despite the decrease in the effective size of pulley 20, since pulleys 34 and 36 are of constant diameter.

At high engine speeds, the effective diameter of pulley 24 is large, as shown in FIG. 5, and the effective diameter of pulley 20 is small, as shown in FIG. 3. After the variable diameter pulleys have reached their extreme effective sizes (which occurs when pulley 24 is in the position shown in FIG. 5), the speeds of both groups of accessories will increase with increased engine speed, as shown, for example, by curves 114c and 116c.

In the interest of brevity and clarity, only one of the second group of accessories has been plotted on the graph of FIG. 8. The curve of the other accessory of that group would be similar to but not necessarily identical with, the curves 116a, 116b and 116c.

It will be noted that pulleys 34 and 36, which are of fixed diameter, are centered with respect to the plane A, and are fixed on the shafts 38, 40 to remain in plane A. As pulley 20 expands and contracts, both side flanges thereof are free to float on the axle on which they are mounted. Thus, the belt 32, which is held in plane A by pulleys 34 and 36, tends to position the flanges 100, 102 symmetrically with respect to plane A. Similarly, the belt 28, which is held in plane A by pulley 20, tends to maintain the flanges 56, 50 of pulley 24 symmetrical with respect to plane A.

Although the best mode contemplated for carrying out the present invention has been herein shown and described, it will be apparent that modification and variation may be made without departing from what is regarded to be the subject matter of the invention.

What is claimed is:

1. In a mechanical power transmission system, the combination comprising a pair of variable diameter pulleys including a drive pulley and a first driven pulley, a first endless belt trained over said pulleys to transmit rotation from the drive pulley to the driven pulley, a first accessory driven by said first driven pulley, means to increase the effective diameter of one of said pulleys and simultaneously decrease the effective diameter of the other of said pulleys in response to the speed of at least one of said pulleys, a second endless belt received on top of said first endless belt in at least one of said pulleys, a second driven pulley to receive said second belt, and a second accessory driven by said second driven pulley.

2. The mechanism of claim 1 in which the flanges of each of said variable diameter pulleys are shiftable parallel to the axes on which they are mounted to maintain the belts in a fixed plane perpendicular to said axes.

3. In a mechanical power transmission system, the combination comprising a drive pulley and at least two driven pulleys, the drive pulley and at least one of said driven pulleys being variable diameter pulleys, a first belt trained over the drive pulley and a driven variable diameter pulley, a second belt trained over the first belt on the drive pulley and at least one of the other driven pulleys, and means responsive to the speed of the drive pulley to change the diameter of the variable diameter pulleys to decrease the speed ratio between the variable diameter drive pulley and said variable diameter driven pulley as the speed of the drive pulley increases.

4. The apparatus of claim 3 in which said drive pulley is connected to an engine and said driven pulleys are connected to accessories to be driven.

5. In a mechanical power transmission system, the combination comprising a drive pulley and at least two driven pulleys, the drive pulley and one of the driven pulleys being variable diameter pulleys, a first belt trained over the drive pulley for driving engagement therewith and trained over the variable diameter driven pulley to transmit power thereto, a second belt trained over the first belt at the drive pulley for driving engagement therewith, said belt trained over at least one of the other driven pulleys to transmit power thereto, and centrifugal means on at least one of said variable diameter pulleys to change the diameter thereof as the speed of the pulley increases, and means on the other of the variable diameter pulleys to change the diameter thereof inversely to the change in diameter of the other variable diameter pulley.

6. The apparatus of claim 5 wherein said drive pulley is connected to an automobile engine to be driven thereby and wherein said driven pulleys are connected to engine accessories to be driven.

7. In a mechanical power transmission system for transmitting power from a vehicle engine to accessories to be driven from the engine, the combination comprising a drive shaft rotated by the engine, a variable diameter drive pulley mounted on the drive shaft, a first driven shaft connected to one of said accessories, a variable diameter driven pulley mounted on said driven shaft, a first belt trained over said drive pulley in driving engagement therewith, said first belt trained over said variable diameter driven pulley for driving engagement therewith, a second driven shaft connected to another of said accessories, a driven pulley mmounted on said second driven shaft, a second belt trained over said first belt at said drive pulley and in driving engagement therewith, said second belt trained over said second driven pulley in driving engagement therewith, centrifugal means on one of said variable diameter pulleys to change the diameter thereof as the speed of the pulley increases, means on the other variable diameter pulley to change the diameter thereof inversely to the change in diameter of the other variable diameter pulley, and means to take up the slack on said second belt when said drive pulley decreases in diameter.

8. The mechanism of claim 7 in which each of the flanges of each of said variable diameter pulleys is shiftable parallel to the axes on which the pulleys are mounted and in which all of the other pulleys are mounted in a common plane, whereby the belts will travel in said common plane.

* * * * *